United States Patent
Matsumoto

(10) Patent No.: US 8,878,834 B2
(45) Date of Patent: Nov. 4, 2014

(54) IMAGE DISPLAY DEVICE WITH MOBILE COMMUNICATION DEVICE DETECTION AND IDENTIFICATION

(75) Inventor: Tomoko Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 13/000,412

(22) PCT Filed: Apr. 16, 2010

(86) PCT No.: PCT/JP2010/056867
§ 371 (c)(1),
(2), (4) Date: Dec. 21, 2010

(87) PCT Pub. No.: WO2010/122962
PCT Pub. Date: Oct. 28, 2010

(65) Prior Publication Data
US 2011/0102444 A1    May 5, 2011

(30) Foreign Application Priority Data
Apr. 20, 2009  (JP) .................................. 2009-102154

(51) Int. Cl.
*G09G 5/39* (2006.01)
*G06T 17/00* (2006.01)
(Continued)

(52) U.S. Cl.
CPC ........... *H04N 21/8153* (2013.01); *H04N 5/775* (2013.01); *G06F 3/147* (2013.01); *H04N 21/4532* (2013.01); *H04N 21/4122* (2013.01);
(Continued)

(58) Field of Classification Search
USPC .......................................................... 345/629
See application file for complete search history.

(56) References Cited

U.S. PATENT DOCUMENTS 7,978,376 B2 * 7/2011 Divine et al. ................. 358/302
8,230,075 B1 * 7/2012 Weskamp et al. ............. 709/227
(Continued)

FOREIGN PATENT DOCUMENTS

CN    101470999 B  * 12/2010
JP    2002-118814 A    4/2002
(Continued)

*Primary Examiner* — David Zarka
*Assistant Examiner* — Jason Pringle-Parker
(74) *Attorney, Agent, or Firm* — Birch, Stewart, Kolasch & Birch, LLP

(57) ABSTRACT

The digital photo frame (1) of the present invention includes: an image data storage section (21) which stores image data associated with identification information of a mobile communication device; a device identifying section (11) which detects the mobile communication device and identifies the identification information of the mobile communication device; and an image display control section (14) which controls, when the mobile communication device is detected, a display section to display image data which is associated with the identification information identified by the device identifying section (11) among image data stored in the image data storage section (21), by carrying out a display control which is different from that for other data. This configuration makes it possible to change a way to display plural pieces of data in accordance with whether or not a detectable mobile communication device is in the device detectable area.

11 Claims, 7 Drawing Sheets

(51) Int. Cl.
*H04N 5/775* (2006.01)
*G06F 3/147* (2006.01)
*H04N 21/45* (2011.01)
*H04N 21/81* (2011.01)
*H04N 21/41* (2011.01)
*H04N 7/16* (2011.01)
*H04N 1/32* (2006.01)
*H04N 21/442* (2011.01)
*H04N 1/00* (2006.01)
*H04N 21/414* (2011.01)
*H04N 21/4363* (2011.01)

(52) U.S. Cl.
CPC ........ *H04N 2201/3226* (2013.01); *H04N 7/163* (2013.01); *H04N 2201/0055* (2013.01); *H04N 1/32128* (2013.01); *G09G 2370/04* (2013.01); *H04N 2201/3252* (2013.01); *H04N 2201/3253* (2013.01); *H04N 21/44227* (2013.01); *H04N 2201/3214* (2013.01); *H04N 2201/3205* (2013.01); *H04N 2201/3277* (2013.01); *G09G 2370/16* (2013.01); *G09G 2380/16* (2013.01); *H04N 1/00307* (2013.01); *H04N 2201/0089* (2013.01); *G09G 2370/042* (2013.01); *H04N 1/00912* (2013.01); *H04N 2201/0036* (2013.01); *H04N 21/41407* (2013.01); *H04N 21/43637* (2013.01)
USPC .......................................... 345/418; 715/255

(56) References Cited

U.S. PATENT DOCUMENTS

| | | | |
|---|---|---|---|
| 2002/0046100 A1* | 4/2002 | Kinjo | 705/14 |
| 2003/0002848 A1* | 1/2003 | Kawaoka et al. | 386/46 |
| 2004/0051719 A1* | 3/2004 | Fukui et al. | 345/660 |
| 2006/0170669 A1* | 8/2006 | Walker et al. | 345/418 |
| 2006/0187228 A1* | 8/2006 | Jung et al. | 345/537 |
| 2007/0149124 A1* | 6/2007 | Onozawa | 455/41.2 |
| 2007/0257927 A1* | 11/2007 | Sakanishi et al. | 345/581 |
| 2008/0238661 A1* | 10/2008 | Camp et al. | 340/539.21 |
| 2008/0309795 A1* | 12/2008 | Mitsuhashi et al. | 348/231.99 |
| 2009/0015515 A1* | 1/2009 | Ichieda | 345/33 |
| 2009/0051826 A1* | 2/2009 | Chang | 348/744 |
| 2009/0099671 A1* | 4/2009 | Harris | 700/94 |
| 2009/0138805 A1* | 5/2009 | Hildreth | 715/745 |
| 2009/0160874 A1* | 6/2009 | Su | 345/660 |
| 2009/0185723 A1* | 7/2009 | Kurtz et al. | 382/118 |
| 2009/0231233 A1* | 9/2009 | Liberatore | 345/1.3 |
| 2009/0237522 A1* | 9/2009 | Lin | 348/222.1 |
| 2010/0171805 A1* | 7/2010 | Ron et al. | 348/14.02 |
| 2011/0050564 A1* | 3/2011 | Alberth et al. | 345/156 |
| 2011/0128242 A1* | 6/2011 | Carney et al. | 345/173 |
| 2011/0309946 A1* | 12/2011 | Jonsson et al. | 340/686.6 |
| 2012/0127196 A1* | 5/2012 | Landry | 345/619 |

FOREIGN PATENT DOCUMENTS

| | | |
|---|---|---|
| JP | 2002-314978 A | 10/2002 |
| JP | 2002-358065 A | 12/2002 |
| JP | 2003-241728 A | 8/2003 |
| JP | 2004-509527 A | 3/2004 |
| JP | 2004-295033 A | 10/2004 |
| JP | 2007-148350 A | 6/2007 |
| JP | 2008-165009 A | 7/2008 |
| JP | 2009-20390 A | 1/2009 |
| JP | 2009-181210 A | 8/2009 |
| WO | WO 02/23885 A1 | 3/2002 |
| WO | WO 2005/088602 A | 9/2005 |
| WO | WO 2010/061889 A1 | 6/2010 |

* cited by examiner

FIG. 3

| IMAGE DATA ID | FILE NAME | REGISTERED DEVICE IDENTIFICATION INFORMATION | REGISTRATION DATE AND TIME | IMAGE DATA (OR STORED LOCATION) | CAPTURE DATE AND TIME | CAPTURE LOCATION |
|---|---|---|---|---|---|---|
| img001 | A001.jpg | 090-1234-5678 | 2009/3/10 0:00 | IMAGE DATA | 2009/1/1 0:00 | △△△ |
| img002 | A002.jpg | 090-1234-5678 | 2009/3/10 0:00 | IMAGE DATA | 2009/1/1 0:00 | △△△ |
| img003 | A003.jpg | 090-1234-5678 | 2009/3/10 0:00 | IMAGE DATA | 2009/2/1 0:00 | ■■■ |
| img004 | B001.jpg | abc@def.ne.jp | 2009/4/3 0:00 | IMAGE DATA | 2009/3/1 0:00 | ◆◆◆ |
| img005 | B002.jpg | abc@def.ne.jp | 2009/4/3 0:00 | IMAGE DATA | 2009/3/1 0:00 | ◆◆◆ |
| img006 | B003.jpg | abc@def.ne.jp | 2009/4/3 0:00 | IMAGE DATA | 2009/3/1 0:00 | ○○○ |
| img007 | X001.jpg | — | 2009/4/3 0:00 | IMAGE DATA | 2009/4/1 0:00 | ●●● |
| img008 | X002.jpg | — | 2009/4/3 0:00 | IMAGE DATA | 2009/4/1 0:00 | ●●● |
| img009 | X003.jpg | — | 2009/4/3 0:00 | IMAGE DATA | 2009/4/1 0:00 | ●●● |
| .. | .. | .. | .. | .. | .. | .. |

FIG. 5

| DISPLAY RULE No. | MOBILE COMMUNICATION DEVICE(S) IN DEVICE DETECTABLE AREA | DISPLAY RULE |
|---|---|---|
| 10 | — | DISPLAY ALL READABLE IMAGE DATA CYCLICALLY (AT RANDOM) |
| 11 | A | DISPLAY ONLY IMAGE DATA TRANSMITTED FROM MOBILE PHONE 2A |
| 12 | B | DISPLAY ONLY IMAGE DATA TRANSMITTED FROM MOBILE PHONE 2B |
| 13 | (OTHER THAN A AND B) | NOT DISPLAY IMAGE DATA TRANSMITTED FROM REGISTERED DEVICE |
| 14 | A+B | PREFERENTIALLY DISPLAY IMAGE DATA TRANSMITTED FROM MOBILE PHONES 2A AND 2B<br>PRIORITY (A:B:OTHER=40%:40%:20%) |
| 15 | A+<br>(OTHER THAN A AND B) | PREFERENTIALLY DISPLAY IMAGE DATA TRANSMITTED FROM MOBILE PHONE 2A<br>NOT DISPLAY IMAGE DATA TRANSMITTED FROM MOBILE PHONE 2B<br>PRIORITY (A:B:OTHER=60%:0%:40%) |
| 16 | B+<br>(OTHER THAN A AND B) | PREFERENTIALLY DISPLAY IMAGE DATA OTHER THAN IMAGE DATA TRANSMITTED FROM REGISTERED DEVICE<br>NOT DISPLAY IMAGE DATA TRANSMITTED FROM MOBILE PHONE 2B<br>PRIORITY (A:B:OTHER=20%:0%:80%) |
| 17 | A+B+<br>(OTHER THAN A AND B) | NOT DISPLAY IMAGE DATA TRANSMITTED FROM MOBILE PHONE 2B |

FIG. 7

| DISPLAY RULE No. | NON-REGISTERED DEVICE | REGISTERED DEVICE | DISPLAY RULE | | SETTING |
|---|---|---|---|---|---|
| 20 | NONE | NONE | DISPLAY BASED ON DEFAULT DISPLAY PATTERN | DISPLAY PATTERN 1: DISPLAY READABLE IMAGE DATA AT RANDOM | ✓ |
| | | | | DISPLAY PATTERN 2: PREFERENTIALLY DISPLAY IMAGE DATA OTHER THAN IMAGE DATA TRANSMITTED FROM REGISTERED DEVICE | ☐ |
| 21 | NONE | SINGLE | DISPLAY BASED ON DISPLAY PATTERN CORRESPONDING TO EXISTING SINGLE REGISTERED DEVICE (EXISTING DEVICE) | DISPLAY PATTERN 1: PREFERENTIALLY DISPLAY IMAGE DATA TRANSMITTED FROM EXISTING DEVICE | A, B |
| | | | | DISPLAY PATTERN 2: NOT DISPLAY IMAGE DATA TRANSMITTED FROM EXISTING DEVICE | |
| | | | | DISPLAY PATTERN 3: DISPLAY IMAGE DATA TRANSMITTED FROM EXISTING DEVICE AT RANDOM WITHOUT PRIORITY | |
| 22 | NONE | PLURAL | DISPLAY BASED ON DISPLAY PATTERN CORRESPONDING TO EACH OF EXISTING PLURAL REGISTERED DEVICES (EXISTING DEVICES) | DISPLAY PATTERN 1: PREFERENTIALLY DISPLAY IMAGE DATA TRANSMITTED FROM EXISTING DEVICE | A |
| | | | | DISPLAY PATTERN 2: IN A CASE WHERE OTHER EXISTING DEVICE IS DETECTED, NOT DISPLAY IMAGE DATA TRANSMITTED FROM SUBJECT EXISTING DEVICE | B |
| | | | | DISPLAY PATTERN 3: IN A CASE WHERE OTHER EXISTING DEVICE IS DETECTED, DISPLAY IMAGE DATA TRANSMITTED FROM SUBJECT EXISTING DEVICE AT RANDOM WITHOUT PRIORITY | |
| 23 | EXIST | NONE | DISPLAY BASED ON DISPLAY PATTERN IN CASE OF ONLY NON-REGISTERED DEVICE | DISPLAY PATTERN 1: DISPLAY READABLE IMAGE DATA AT RANDOM | ☐ |
| | | | | DISPLAY PATTERN 2: DISPLAY IMAGE DATA OTHER THAN IMAGE DATA TRANSMITTED FROM REGISTERED DEVICE | ☐ |
| | | | | DISPLAY PATTERN 3: PREFERENTIALLY DISPLAY IMAGE DATA OTHER THAN IMAGE DATA TRANSMITTED FROM REGISTERED DEVICE | ✓ |
| 24 | EXIST | SINGLE | DISPLAY BASED ON DISPLAY PATTERN CORRESPONDING TO COMBINATION OF EXISTING REGISTERED DEVICE AND NON-REGISTERED DEVICE | DISPLAY PATTERN 1: IN A CASE WHERE SINGLE REGISTERED DEVICE EXISTS IN ADDITION TO NON-REGISTERED DEVICE, NOT DISPLAY IMAGE DATA TRANSMITTED FROM THE REGISTERED DEVICE | B |
| | | | | DISPLAY PATTERN 2: IN A CASE WHERE REGISTERED DEVICE EXISTS, PREFERENTIALLY DISPLAY IMAGE DATA TRANSMITTED FROM THE EXISTING DEVICE, EVEN THOUGH NON-REGISTERED DEVICE EXISTS. | |
| | | | | DISPLAY PATTERN 3: IN A CASE WHERE SINGLE REGISTERED DEVICE EXISTS IN ADDITION TO NON-REGISTERED DEVICE, DISPLAY IMAGE DATA TRANSMITTED FROM THE EXISTING DEVICE AND OTHER IMAGE DATA AT RANDOM | A |
| 25 | EXIST | PLURAL | DISPLAY BASED ON DISPLAY PATTERN CORRESPONDING TO COMBINATION OF EXISTING PLURAL REGISTERED DEVICES AND NON-REGISTERED DEVICE | DISPLAY PATTERN 1: IN A CASE WHERE SUBJECT EXISTING DEVICE IS DETECTED, PREFERENTIALLY DISPLAY IMAGE DATA TRANSMITTED FROM THE SUBJECT EXISTING DEVICE, EVEN THOUGH NON-REGISTERED DEVICE AND OTHER REGISTERED DEVICE ARE DETECTED. | |
| | | | | DISPLAY PATTERN 2: IN A CASE WHERE SUBJECT EXISTING DEVICE IS DETECTED IN ADDITION TO NON-REGISTERED DEVICE AND OTHER REGISTERED DEVICE, NOT DISPLAY IMAGE DATA TRANSMITTED FROM THE SUBJECT EXISTING DEVICE | B |
| | | | | DISPLAY PATTERN 3: IN A CASE WHERE SUBJECT EXISTING DEVICE IS DETECTED IN ADDITION TO NON-REGISTERED DEVICE AND OTHER REGISTERED DEVICE, DISPLAY IMAGE DATA TRANSMITTED FROM THE SUBJECT EXISTING DEVICE AT RANDOM WITHOUT PRIORITY | A |
| | | | | DISPLAY PATTERN 4: EVEN IN A CASE WHERE NON-REGISTERED DEVICE OR OTHER REGISTERED DEVICE EXIST, PREFERENTIALLY DISPLAY IMAGE DATA TRANSMITTED FROM SUBJECT EXISTING DEVICE | |
| | | | | DISPLAY PATTERN 5: IN A CASE WHERE NON-REGISTERED DEVICE AND OTHER REGISTERED DEVICE EXIST, NOT DISPLAY IMAGE DATA TRANSMITTED FROM SUBJECT EXISTING DEVICE | |
| | | | | DISPLAY PATTERN 6: IN A CASE WHERE NON-REGISTERED DEVICE AND OTHER REGISTERED DEVICE EXIST, DISPLAY IMAGE DATA TRANSMITTED FROM ALL EXISTING DEVICES INCLUDING SUBJECT DEVICE AT RANDOM WITHOUT PARTICULAR PRIORITY | |
| | | | | DISPLAY PATTERN 7: IN A CASE WHERE NON-REGISTERED DEVICE EXISTS, NOT DISPLAY IMAGE DATA TRANSMITTED FROM SUBJECT EXISTING DEVICE, REGARDLESS OF EXISTENCE OF OTHER REGISTERED DEVICE | |
| | | | | DISPLAY PATTERN 8: IN A CASE WHERE NON-REGISTERED DEVICE EXISTS, DISPLAY IMAGE DATA TRANSMITTED FROM REGISTERED DEVICE AT RANDOM WITHOUT PARTICULAR PRIORITY, REGARDLESS OF EXISTENCE OF OTHER REGISTERED DEVICE | |

IMAGE DISPLAY DEVICE WITH MOBILE COMMUNICATION DEVICE DETECTION AND IDENTIFICATION

TECHNICAL FIELD

The present invention relates to an information display device and an information display method for displaying information such as image data (static image, moving image).

BACKGROUND ART

According to a conventional image display device, image data is displayed on a display section such as a liquid crystal panel. The image data has been stored in the image display device or supplied from an image supply source such as an external storage medium or a mobile communication device, and is sent to the display section so that the display section displays the image data. Such a conventional image display device has been realized as an electronic device such as a personal computer (PC), a digital television, or a digital photo frame.

For example, Patent Literature 1 discloses a stand-alone monitor with which a high-definition digital image can be viewed without using a PC. In Patent Literature 1, an image is supplied from a wireless image supply source or an electronic storage medium, and the image is displayed on the monitor in response to an operation by a user. The user can directly operate the monitor so that the monitor displays a plurality of images in a slide show.

As described above, while a technique of reproducing an image has been developed, countermeasures have been devised as to how to manage and use image data stored in the device.

For example, Patent Literature 2 discloses (i) an image storing device which receives images via a mobile phone and then stores, for users, the respective images thus received, and (ii) a delivering medium preparation device in which the images are stored in a computer-readable storage medium. Specifically, the delivering medium producing device includes a database in which user IDs are stored so as to be associated with respective images, and carries out (i) sorting of stored images for the respective users so that the stored images are stored in a storage medium and (ii) an image reprint process.

As described above, a process is carried out with respect to an image in accordance with its associated information such as a user ID. The image display device can display an image in accordance with its associated information, instead of the user's direct operation as in the technique of Patent Literature 1.

For example, Patent Literature 3 discloses an image display device which (i) receives pieces of image data from a plurality of mobile communication devices (e.g., mobile phones) and (ii) displays a list of the pieces of image data. The image display device receives the pieces of image data along with pieces of identification information unique to the respective mobile communication devices. Further, the image display device determines where (how large) the pieces of the image data are displayed based on a positional relation (a distance) between the image display device and the respective mobile communication devices which have transmitted the respective pieces of image data, when the list of the pieces of image data is displayed.

CITATION LIST

Patent Literature

Patent Literature 1
Japanese Patent Application Publication, Tokuhyo, No. 2004-509527 (International Publication No. WO2002/023885) (International Publication Date: Mar. 21, 2002)
Patent Literature 2
Japanese Patent Application Publication, Tokukai, No. 2002-118814 (Publication Date: Apr. 19, 2002)
Patent Literature 3
Japanese Patent Application Publication, Tokukai, No. 2007-148350 (Publication Date: Jun. 14, 2007)

SUMMARY OF INVENTION

Technical Problem

However, according to the configuration of Patent Literature 3, it is assumed that (i) the mobile communication devices which supply the respective pieces of image data and (ii) the image data managed and displayed by the image display device always have a one-to-one correspondence. This leads to problems that such a configuration of Patent Literature 3 is not applicable (i) in a case where a piece of image data which is being displayed and a mobile communication device whose position is being monitored do not have a one-to-one correspondence (for example, in a case where a mobile communication device which is an image supply source cannot be detected or in a case where a mobile communication device which is not an image supply source is wrongly detected) or (ii) in a case where a plurality of pieces of image data and image supply sources (mobile communication devices) have many-to-many correspondences (for example, in a case where a plurality of pieces of image data are intended to be displayed in a slide show or in a case where image data to be displayed is replaced by another piece of image data.

Note that the problems are not inherent only in the image display device which displays image data, but are common in information display devices each of which displays various kinds of data which are received from a mobile communication device based on a relation with the mobile communication device which is the supply source.

The present invention is accomplished in view of the problems, and its object is to realize an information display device and an information display method in which ways to display a plurality of pieces of data (display control methods) are changed in accordance with whether or not a detectable mobile communication device exists.

Solution to Problem

In order to attain the object, in an information display device of the present invention, a display section displays plural pieces of data stored in a data storage section, the information display device, further including: a device detector configured to detect a mobile communication device and identifying identification information of the mobile communication device, the identification information of the mobile communication device being associated with part of the plural pieces of data stored in the data storage section; and a data display controller configured to carry out a first display control in which the display section displays one or more first pieces of data, when the device detector detects the mobile communication device, the one or more first pieces of data being associated with the identification information identified by the device detector, out of the plural pieces of data stored in the data storage section, the first display control being different from a second display control which is carried out with respect to one or more second pieces of data other than the one or more first pieces of data.

In order to attain the object, a method of the present invention for displaying information is a method for an information display device in which a display section displays plural pieces of data stored in a data storage section, the method including the steps of: (a) detecting a mobile communication device and identifying identification information of the mobile communication device, the identification information of the mobile communication device being associated with part of the plural pieces of data stored in the data storage section; and (b) carrying out a first display control in which the display section displays one or more first pieces of data, when the mobile communication device is detected in the step (a), the one or more first pieces of data being associated with the identification information identified in the step (a), out of the plural pieces of data stored in the data storage section, the first display control being different from a second display control which is carried out with respect to one or more second pieces of data other than the one or more first pieces of data.

According to the configuration, first, the device detector detects a mobile communication device and identifies identification information of the mobile communication device thus detected.

Then, the data display controller identifies, based on the identification information which has been identified by the device detector, data which is associated with the identification information among the plural pieces of data stored in the data storage section. That is, the data display controller distinguishes (i) the first piece of data which is associated with a mobile communication device detected by the device detector from (ii) other data.

Lastly, the data display controller carries out a display control, which is different from a display control to the other data, to the data which is associated with the mobile communication device detected by the device detector so that the display section displays the data associated with the mobile communication device in a manner different from that for the other data.

As such, the data which is associated with the mobile communication device detected by the device detector is displayed on the display section based on the display control which is different from a display control with respect to the other data.

As a result, the information display device is capable of changing a way (display controlling method) to display plural pieces of data in accordance with existence or nonexistence of a detectable mobile communication device exists.

Advantageous Effects of Invention

In order to attain the object, in the information display device of the present invention, a display section displays plural pieces of data stored in a data storage section, the information display device, further including: a device detector configured to detect a mobile communication device and identifying identification information of the mobile communication device, the identification information of the mobile communication device being associated with part of the plural pieces of data stored in the data storage section; and a data display controller configured to carry out a first display control in which the display section displays one or more first pieces of data, when the device detector detects the mobile communication device, the one or more first pieces of data being associated with the identification information identified by the device detector, out of the plural pieces of data stored in the data storage section, the first display control being different from a second display control which is carried out with respect to one or more second pieces of data other than the one or more first pieces of data.

In order to attain the object, the method of the present invention for displaying information is a method for an information display device in which a display section displays plural pieces of data stored in a data storage section, said method comprising the steps of: (a) detecting a mobile communication device and identifying identification information of the mobile communication device, the identification information of the mobile communication device being associated with part of the plural pieces of data stored in the data storage section; and (b) carrying out a first display control in which the display section displays one or more first pieces of data, when the mobile communication device is detected in the step (a), the one or more first pieces of data being associated with the identification information identified in the step (a), out of the plural pieces of data stored in the data storage section, the first display control being different from a second display control which is carried out with respect to one or more second pieces of data other than the one or more first pieces of data.

The configuration makes it possible to change a way to display plural pieces of data in accordance with whether or not a detectable mobile communication device exists.

BRIEF DESCRIPTION OF DRAWINGS

FIG. 3 is a table illustrating an example of a data structure of image data stored in an image data storage section of the digital photo frame.

FIG. 5 is a table illustrating a concrete example of display rules stored in the display rule storage section of the digital photo frame.

FIG. 7 is a table illustrating another concrete example of display rules stored in the display rule storage section of the digital photo frame.

DESCRIPTION OF EMBODIMENTS

The following describes an embodiment of the present invention with reference to drawings.

The following embodiment discusses, as an example, a case where an information display device of the present invention is applied to a digital photo frame. Further, the following embodiment discusses an image display system in which the digital photo frame displays a piece of image data transmitted from a mobile phone, in a case where the mobile communication device which is an image data supply source is a mobile phone.

Embodiment 1

[Overview of Image Display System]

Figure 2:
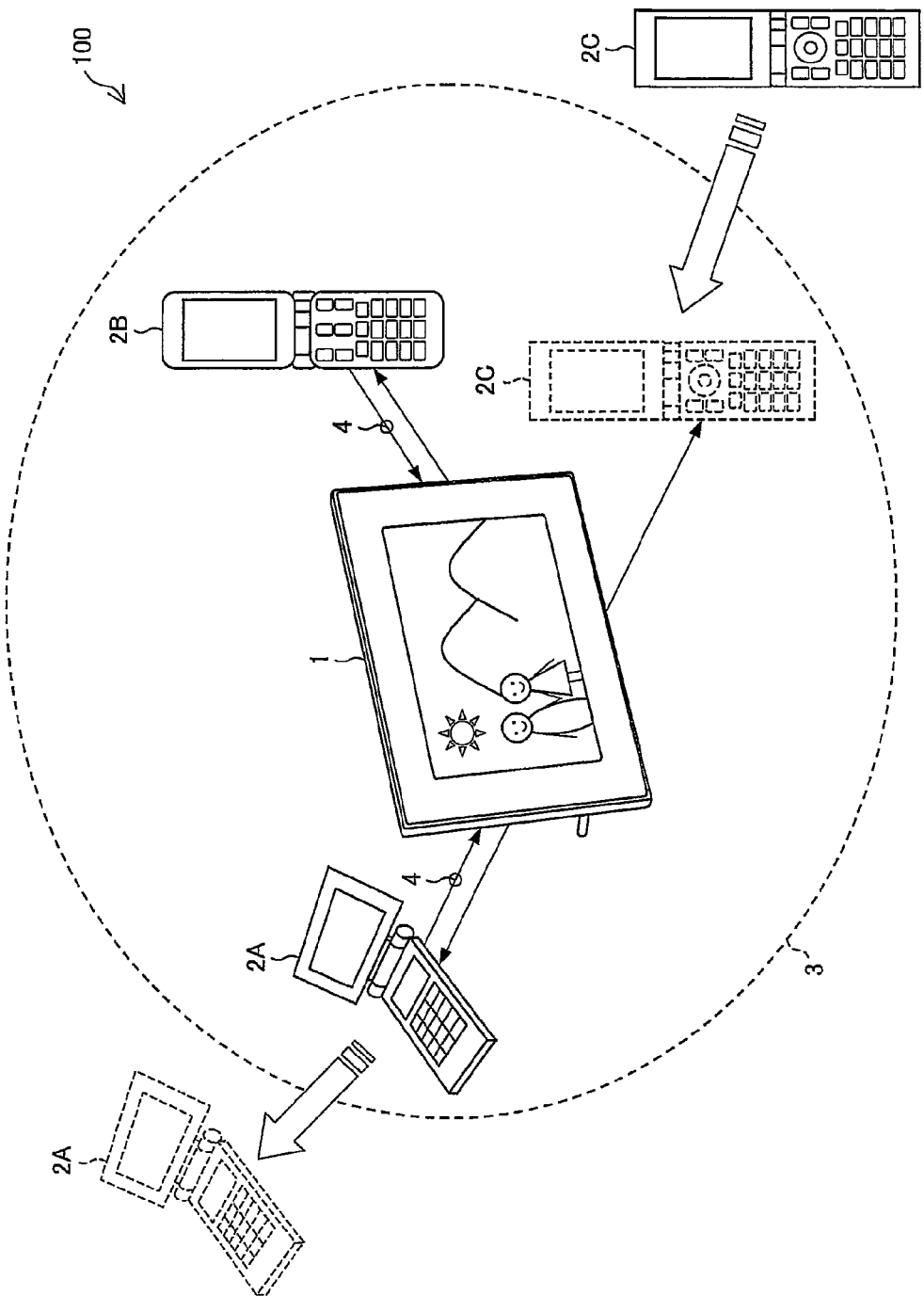
FIG. 2 is a schematic view illustrating how an image display system is wholly configured in the present invention.

FIG. 2 is a schematic view illustrating how an image display system 100 is wholly configured in an embodiment of the present invention.

The image display system 100 of the present embodiment includes a digital photo frame 1 which displays a plurality of pieces of image data and one or more mobile phones (2A, 2B, 2C . . . ) which supply the respective plurality of pieces of image data to the digital photo frame 1 (see FIG. 2). Hereinafter, in a case where the mobile phones do not need to be distinguished from one another, the mobile phones are collectively referred to as a mobile phone 2.

The digital photo frame 1 serves as a photo frame by displaying pieces of image data (such as a photograph and a moving image which are digital data) on a display section of the digital photo frame 1. The digital photo frame 1 stores a plurality of pieces of image data in a storage section (data storage section) of the digital photo frame 1. The digital photo frame 1 further includes an interface section via which a removable external storage medium (data storage section) is inserted into the digital photo frame 1. The digital photo frame 1 can read out a plurality of pieces of image data from the external storage medium. The digital photo frame 1 has a function to display the plurality of pieces of image data which have been read out from the storage section or from the external storage medium. For example, the digital photo frame 1 is capable of (i) displaying pieces of image data in a slide show at arbitrary intervals, (ii) concurrently displaying a plurality of pieces (two or three pieces) of image data sequentially with an arbitrary layout and at an arbitrary timing, and (iii) displaying a thumbnail list of more pieces of image data. The functions of the digital photo frame 1 to display the plurality of pieces of image data are collectively referred to as an image data display function.

Moreover, according to the present embodiment, the digital photo frame 1 has a short-range wireless communication function. Accordingly, the digital photo frame 1 can detect and communicate with the mobile phone 2 in a predetermined communicable area (e.g., a device detectable area 3 shown in FIG. 2).

According to the example shown in FIG. 2, the digital photo frame 1 is now detecting the mobile phones 2A and 2B in the device detectable area 3. In a case where the mobile phone 2A is moved outside the device detectable area 3, the digital photo frame 1 no longer detects the mobile phone 2A. In a case where the mobile phone 2C is moved in the device detectable area 3, the digital photo frame 1 detects the mobile phone 2C.

Each of the mobile phones 2 in the device detectable area 3 supplies image data 4 to the digital photo frame 1 via an appropriate short-range wireless communication device such as infrared communication or Bluetooth (registered trademark).

Note that, when the mobile phone 2 transmits image data and identification information to the digital photo frame 1, it is possible to use a wireless communication device instead of Bluetooth (registered trademark). Such a wireless communication device can be, for example, high-speed infrared communication such as IrSimple (registered trademark) or short-range wireless communication such as WiFi (registered trademark). Alternatively, the mobile phone 2 can supply an image to the digital photo frame 1 via a wired communication device such as a wired LAN or an USB cable, provided that image data can be supplied while identification information for identifying an image data supply source is being associated with the image data.

Moreover, in a case where image data is transmitted from the mobile phone 2 to the digital photo frame 1, the image data and the identification information can be transmitted separately, provided that countermeasures have been devised so that the image data and the identification information of the mobile phone 2 can be linked later. Alternatively, the image data in which the identification information is embedded in advance can be transmitted.

[Configuration of Digital Photo Frame]

Figure 1:
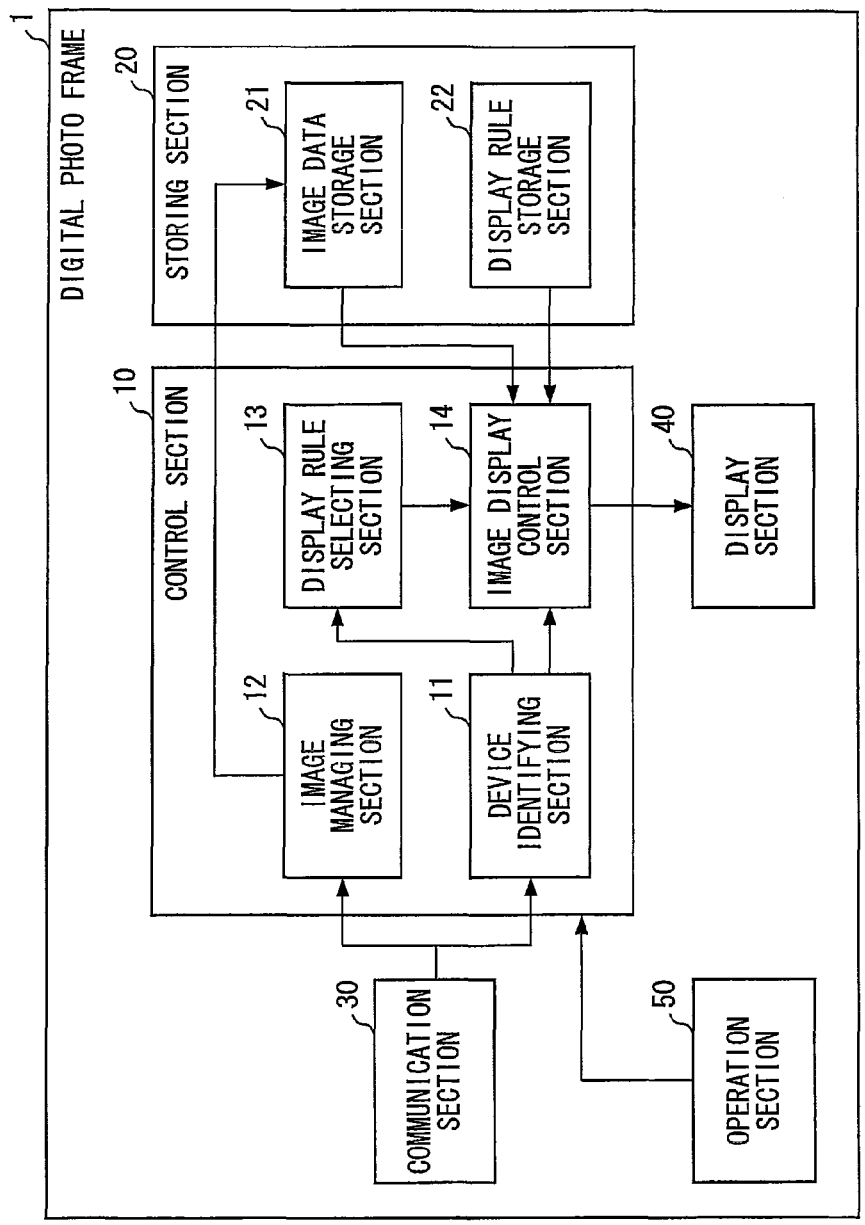
FIG. 1 is a functional block diagram illustrating how a main part of a digital photo frame is configured in the present invention.

FIG. 1 is a functional block diagram illustrating how a main part of the digital photo frame 1 is configured in the present invention. As shown in FIG. 1, the digital photo frame 1 includes a control section 10, a storage section 20, a communication section 30, a display section 40, and an operation section 50.

The communication section 30 communicates with a mobile communication device such as the mobile phone 2 via the wireless communication device or wired communication device so as to exchange data. The present embodiment employs the Bluetooth (registered trademark) technique as an example of the short-range wireless communication protocol via which the communication section 30 communicates with the mobile phones 2. The communication section 30 receives pieces of image data transmitted from the mobile phones 2. Moreover, the communication section 30 detects a communicable mobile communication device in the device detectable area 3, and obtains identification information of a detected mobile communication device.

In accordance with a command from the control section 10, the display section 40 displays image data which has been read out by the digital photo frame 1 or various kinds of information such as a setting menu screen. For example, the display section 40 can be realized by a display device such as an LC (Liquid Crystal) display panel or an EL (Electro Luminescent) display panel.

The operation section 50 is provided for a user to carry out operation inputs with respect to the digital photo frame 1. The operation section 50 is not limited to a particular one. For example, the operation section 50 can be realized by (i) buttons and/or switches, etc. directly provided in a main body of the digital photo frame 1, (ii) a remote controller, etc., or (iii) a touch panel which is provided to be integral with the display section 40.

Via the operation inputs, the user commands, for example, to turn on or off the power of the digital photo frame 1, to start or quit a slide show display, to delete image data, and to change various settings.

The storage section 20 stores (i) a control program and an OS program executed by the control section 10 and (ii) various kinds of data to be read out when the control section 10 causes the digital photo frame 1 to carry out various functions. In particular, the storage section 20 stores various programs and image data which are to be read out when the digital photo frame 1 carries out the image data display function. Specifically, the storage section 20 may include an image data storage section 21 and a display rule storage section 22.

The control section 10 comprehensively controls operations of respective sections of the digital photo frame 1. The control section 10 can be configured by, for example, a CPU (Central Processing Unit), or the like. When the control section 10 operates, a working area is secured in a temporary storage section (not illustrated) which includes, for example, a RAM (Random Access Memory).

The control section 10 includes functional blocks such as, at least, a device identifying section 11, an image managing section 12, and an image display control section 14. The control section 10 may further include a display rule selecting section 13. The functional blocks can be realized by causing the CPU (i) to read out programs from a storage device (storage section 20) which is realized by a ROM (read only memory) and other devices in the RAM (not illustrated), etc., and (ii) to execute the programs.

The image managing section 12 causes the image data storage section 21 to store image data which the communication section 30 has received from a mobile communication device such as the mobile phone 2. In the storing of the image data, the image managing section 12 causes the image data storage section 21 to store the image data while identification information of the mobile communication device which is a supply source of the image data is being associated with the image data.

The identification information is not limited to specific one, provided that it is information, such as a phone number, an email address, an IP address, or a serial number of the mobile phone 2, which allows the digital photo frame 1 to uniquely identify the mobile communication device. Moreover, in a case where the digital photo frame 1 holds a list of mobile communication devices each of which is an image data supply source, the mobile phones 2 can be identified in accordance with pieces of identification information which have been uniquely assigned, by the digital photo frame 1, with respect to the mobile communication devices in the list. In this case, the image managing section 12 may cause the image data storage section 21 to store the image data while the image data is being associated with unique identification information which corresponds to original identification information such as a phone number of the image data supply source.

Note that, in a case where the image data is supplied to the digital photo frame 1 while the image data is not associated with the identification information of the image data supply source, the image managing section 12 may cause the image data storage section 21 to store the image data on while the image data is not associated with the identification information. This situation will occur in a case where, for example, (i) a digital camera which does not have a communication function sends image data to the digital photo frame 1 via a cable or (ii) an external storage medium such as a USB memory is inserted into the digital photo frame 1 so that the digital photo frame 1 reads out data from the external storage medium.

The device identifying section 11 identifies a mobile communication device detected in the device detectable area 3 by the communication section 30. For example, the device identifying section 11 transmits a query in the device detectable area 3 via the communication section 30. A mobile phone 2 which has received the query in the device detectable area 3 sends back, as a response to the query, its identification information to the digital photo frame 1. In accordance with the identification information, the device identifying section 11 identifies the mobile phone 2 and other mobile communication device(s) which are in the device detectable area 3. The device identifying section 11 transmits, to the image display control section 14, the identification information of the mobile phone 2 which is in the device detectable area 3. Instead, the device identifying section 11 can identify a device based on unique identification information corresponding to identification information which the digital photo frame 1 has received as a response to the query.

The image display control section 14 controls the display section 40 to display image data read out from the image data storage section 21 in accordance with a display rule stored in the display rule storage section 22.

According to the present embodiment, specifically, the display rule storage section 22 stores (i) a "display rule 00: all pieces of image data which can be read out by the image display control section 14 are cyclically displayed at equal intervals", which display rule defines how to display in default (display control method in default) and (ii) a "display rule 01: image data is displayed which is supplied from a mobile communication device which is in the device detectable area 3", which display rule defines how to display in a special case (display control method in a special case).

The image display control section 14 determines whether or not the mobile communication device which is the image data supply source is in the device detectable area 3, based on the identification information received from the device identifying section 11 and with reference to the image data storage section 21. In a case where the image display control section 14 determines that the mobile communication device which is the image data supply source is in the device detectable area 3 (i.e., a special case), the image display control section 14 (i) searches to read out, from the image data storage section 21, image data which is associated with the identification information of the mobile communication device, and then (ii) controls the display section 40 to display the image data in accordance with the display rule 01. In a normal case other than the special case, the image display control section 14 reads out readable image data from the image data storage section 21 or from an external storage medium, and then controls the display section 40 to carry out a slide show display in accordance with the display rule 00.

Note that, hereinafter, a mobile communication device whose identification information has been registered on the image data storage section 21, that is, a mobile communication device whose image data has been registered in advance on the digital photo frame 1 is referred to as a registered device. On the other hand, a mobile communication device whose identification information is not associated with image data, that is, a mobile communication device whose image data is not registered on the digital photo frame 1 is referred to as a non-registered device.

According to the present embodiment, the image display control section 14 controls the display section 40 to change how to display image data by switching between the display rules 00 and 01, based on whether or not a registered device is in the device detectable area 3.

Details of functions and operations of the display rule selecting section 13 are described later in Embodiment 2.

[Image Data Storage Section]

FIG. 3 is a table illustrating an example of a data structure of image data which is stored in the image data storage section 21 of the digital photo frame 1.

The image data storage section 21 stores image data which is supplied from the mobile phone 2 so as to be associated with identification information of the mobile phone 2 which has supplied the image data (see FIG. 3).

According to the example shown in FIG. 3, the image managing section 12 (i) assigns an image data ID to each piece of supplied image data and (ii) causes the image data storage section 21 to store the each piece of image data so as to associate a file name of the each piece of image data with identification information of a mobile phone 2 which is a supply source of the each piece of image data. The image managing section 12 may further associate the image data with date and time (registered date and time) at which the each piece of image data is supplied to the digital photo frame 1. Moreover, information as to date, time, and location of capturing the image data may be attached, as relative information of the image data, to the each piece of image dada when the mobile phone 2 captures the each piece of image data. The image managing section 12 may cause the image data storage section 12 to store the each piece of image data so as to associate the relative information with the each pieced of image data.

Note that the data structure of the image data storage section 21 managed by the image managing section 12 is not limited to the example shown in FIG. 3. According to the present invention, the image data, which has been supplied from the mobile phone 2, may have any structure, provided that the image data is associated with at least the identification information of the mobile phone 2.

More specifically, for example, when the communication section 30 receives pieces of image data (A001.jpg, A002.jpg, and A003.jpg) from the mobile phone 2A, the image managing section 12 causes the image data storage section 21 to store the pieces of image data on so as to associate the pieces of image data with identification information (e.g., a phone number (090-1234-5678)) of the mobile phone 2A which is a supply source of the pieces of image data. Similarly, when the communication section 30 receives pieces of image data (B001.jpg, B002.jpg, and B003.jpg) from the mobile phone 2B, the image managing section 12 causes the image data storage section 21 to store the pieces of image data so as to associate the pieces of image data with a phone number of the mobile phone 2B. Note here that it is possible for each of the pieces of image data to be stored, in the image data storage section 21, so as to be associated with an email address (abc@def.ne.jp) instead of the phone number. In a case where pieces of image data are supplied from an unknown image data supply source, such as in a case where the pieces of image data are supplied via infrared communication or supplied from a digital camera via a cable, the pieces of image data (X001.jpg, X002.jpg, and X003.jpg) are stored in the image data storage section 21 so as to be given respective image data IDs, without being associated with identification information in particular.

As shown in FIG. 3, the mobile communication device whose identification information is associated with image data stored in the digital photo frame 1 is a device which has already registered the image data on the digital photo frame 1 via Bluetooth communication.

For example, according to the above description and the examples shown in FIGS. 2 and 3, each of the mobile phones 2A and 2B which has transmitted the image data to the digital photo frame 1 is referred to as a registered device, whereas the mobile phone 2C which has not transmitted image data to the digital photo frame 1 is referred to as a non-registered device.

When the image display control section 14 receives, from the device identifying section 11, identification information of a device identified by the device identifying section 11, the image display control section 14 refers to the table of image data shown in FIG. 3 so as to determine whether the device having the identification information is a registered device or a non-registered device.

Note that, in a state where pieces of image data are readable by inserting an external storage medium into an interface section (not illustrated) of the digital photo frame 1, the image managing section 12 may register the data IDs and the addresses on the table of image data shown in FIG. 3 so as to associate image data IDs with respective addresses where the pieces of image data are stored in the external storage medium.

[Image Display Process of Digital Photo Frame]

Figure 4:
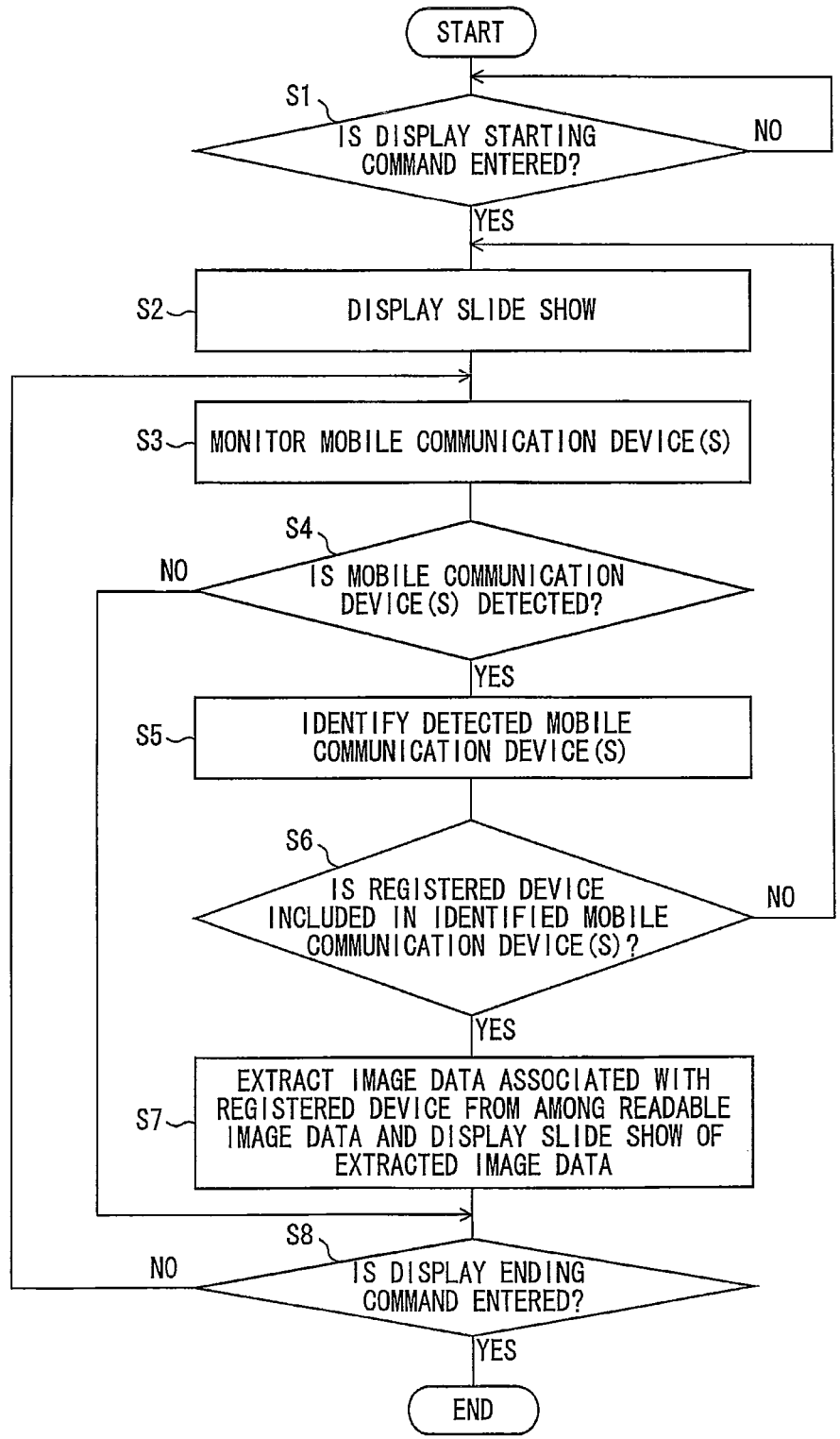
FIG. 4 is a flowchart illustrating a flow of an image data display process performed by the digital photo frame in an embodiment of the present invention.

With reference to FIG. 4, the following describes an operation flow of an image data display process in which the digital photo frame 1 displays image data in accordance with presence or absence of a mobile communication device. FIG. 4 is a flowchart illustrating a flow of an image data display process performed by the digital photo frame 1 in accordance with the embodiment of the present invention. The following describes, as an example, a process flow which is carried out in a case where the digital photo frame 1 carries out a slide show display with respect to plural pieces of image data which can be read out from the storage section 20 or an external storage medium.

When an input receiving section (not illustrated) of the control section 10 receives a command, which causes starting of a slide show display, entered by a user via the operation section 50 (YES in S1), the image display control section 14 controls the display section 40 to start a slide show display (S2). That is, the image display control section 14 (i) reads out pieces of readable image data cyclically (from the image data storage section 21 or the external storage medium) with reference to the image data storage section 21, and then (ii) controls the display section 40 to sequentially display the pieces of readable image data. After the slide show display is started, the device identifying section 11 controls the communication section 30 to start to monitor a mobile communication device(s) in the device detectable area 3 (S3).

As long as (i) the communication section 30 does not detect a mobile communication device (NO in S4) and (ii) the user does not enter a command which causes the slide show display to be ended (NO in S8), the image display control section 14 controls the display section 40 to continue the slide show display based on a default display rule, and the device identifying section 11 controls the communication section 30 to continue the monitoring. According to the present embodiment, the default display of the slide show refers to, as described above, the "display rule 00: all pieces of image data which can be read out by the image display control section 14 are displayed cyclically at even intervals". The present embodiment is, however, not limited to this. Namely, the default display rule can be arbitrarily set.

In a case where the communication section 30 detects mobile communication devices (YES in S4), that is, in a case where the mobile communication devices are in the device detectable area 3, the device identifying section 11 obtains identification information from the communication section 30 so as to identify the mobile communication devices in the device detectable area 3 (S5).

Then, the image display control section 14 refers to the image data storage section 21 (shown in FIG. 3) so as to determine whether or not a registered device (i.e., a supply source of image data stored in the image data storage section 21) is included in the mobile communication devices identified by the device identifying section 11 (S6). In a case where the image display control section 14 determines that a registered device is included (YES in S6), the image display control section 14 (i) extracts, in accordance with the display rule 01, pieces of image data associated with the registered device from pieces of readable image data stored in the image data storage section 21 or the external storage medium, and (ii) sends, to the display section 40, the pieces of image data thus extracted (S7). With this process, the slide show display is carried out with respect to only image data supplied from the registered device which is in the device detectable area 3.

On the other hand, in a case where the image display control section 14 determines that no registered device is included (NO in S6), the image display control section 14 continues the slide show display with respect to the default of S2 in accordance with the display rule 00. Moreover, the communication section 30 continues the monitoring of the mobile communication device (S3).

As long as the user does not enter a command which causes the ending of the slide show display (NO in S8) after the slide show display is started based on the display rule 01 in S7, the image display control section 14 continues the slide show display and the communication section 30 continues the monitoring. When the control section 10 receives from the user, via the operation section 50, the command which causes the slide show display to end to (YES in S8), the image display control section 14 stops sending image data to the display section 40 and terminates the process.

According to the method, it is possible for the digital photo frame 1 to change pieces of image data, which are to be subjected to a slide show display, in accordance with whether or not a registered device is in the device detectable area 3 of the digital photo frame 1. For example, it is possible to carry out a slide show display with respect to only pieces of image data which have been supplied and registered by a registered mobile communication device which is in the device detectable area 3.

More specifically, it is assumed that the user transmits pieces of image data to the digital photo frame 1 with the use of the mobile phone 2A and registers the pieces of image data on the digital photo frame 1. As long as the user who possesses the mobile phone 2A is out of the device detectable area 3 of the digital photo frame 1 (indicated by a dotted mobile phone 2A in FIG. 2), the digital photo frame 1 carries out a slide show display with respect to all pieces of readable image data at even intervals in accordance with the display rule 00. Then, when the user with the mobile phone 2A comes near the digital photo frame 1 to a degree that the mobile phone 2A is detected in the device detectable area 3, the digital photo frame 1 can carry out, in accordance with the display rule 01, a slide show with respect to only pieces of image data supplied from the mobile phone 2A. This is because the digital photo frame 1 determined that a registered device was in the device detectable area 3.

As described above, as long as the user is so near the digital photo frame 1 as to view pieces of image data displayed on the digital photo frame 1, the user is able to view a slide show display which is carried out with respect to only the pieces of image data which the user has registered. The ways of the slide show display is automatically changed by the digital photo frame 1 in accordance with whether or not the mobile phone 2A is in the device detectable area 3. Therefore, it is possible for the user to efficiently view the pieces of image data, which have been registered by the user, on the digital photo frame 1 without any additional operation. The digital photo frame 1 can be shared by a plurality of users. As long as each of the plurality of users is near the digital photo frame 1, the digital photo frame 1 can change images to be displayed so that the digital photo frame 1 carries out a slide show display with respect to only pieces of image data registered by the each of the plurality of users, without receiving specific operations from the respective plurality of users. As a result, it is possible to enhance the conveniences for the respective plurality of users.

[Concrete Example of Image Display Process of Digital Photo Frame]

The following description discusses how the digital photo frame 1 of the present embodiment carries out an image display process in accordance with a positional relation between the digital photo frame 1 and the mobile phones 2, with reference to the image display system 100 shown in FIG. 2 which is a concrete example. Note that the following description is based on the premise that (i) the image data storage section 21 stores pieces of image data (image data IDs: img001 through img009) as shown in FIG. 3 and (ii) the display rule 00 "a slide show display is carried out, in a predetermined order (or in a random order), with respect to all pieces of image data which can be read out by the image display control section 14" is set as a default display rule.

When a slide show display is commanded by a user, the image display control section 14 (i) reads out all pieces of the image data (the image data IDs: the img001 through the img009) from the image data storage section 21 (or an external storage medium), and then (ii) sends all of the pieces of image data to the display section 40 in a predetermined order (or in a random order) so as to control the display section 40 to display all of the pieces of image data (see S2).

In S3, the communication section 30 starts to monitor a mobile communication device, and detects the mobile phones 2A and 2B in the device detectable area 3 (see FIG. 2). The device identifying section 11 obtains identification information via the communication section 30. That is, the device identifying section 11 obtains identification information, i.e., "a phone number: 090-1234-5678" of the mobile phone 2A and identification information, i.e., "an email address: abc@def.ne.jp" of the mobile phone 2B. This allows the digital photo frame 1 to recognize the mobile phones 2A and 2B in the device detectable area 3.

The image display control section 14 refers to the image data storage section 21 and determines that both the mobile phones 2A and 2B are registered devices that are associated with the respective pieces of image data stored in the image data storage section 21. Then, the image display control section 14 (i) extracts, based on the identification information from the image data storage section 21, (a) the pieces of image data (the img001 through the img003) supplied from the mobile phone 2A and (b) the pieces of image data (the img004 through the img006) supplied from the mobile phone 2B and (ii) controls the display section 40 to carry out a slide show display with respect to the pieces of image data (a) and (b) in accordance with the display rule 01.

Then, for example, in a case where no command which causes the display to be ended is not entered by the user and in a case where the mobile phone 2A is moved outside the device detectable area 3, the image display control section 14 (i) determines that only the mobile phone 2B is a mobile communication device which is in the device detectable area 3 and (ii) carries out a slide show display with respect to only the pieces of image data img004 through img006.

As described above, the digital photo frame 1 of the present embodiment can recognize a mobile communication device which is in the device detectable area 3, and then can display image data which is associated with the mobile communication device thus recognized.

Embodiment 2

The following describes another embodiment of the information display device of the present invention, with reference to FIGS. 1 through 3, and FIGS. 5 and 6. Specifically, according to the present embodiment, a digital photo frame 1, which serves as the information display device, detects a mobile phone(s) 2 in the device detectable area 3, and then selects a display rule in accordance with the mobile phone 2 (in accordance with a combination of the mobile phones 2) thus detected. According to Embodiment 1, a single display rule is prepared, except for the default display rule. On the other hand, according to the present embodiment, a plurality of particular display rules are prepared, which are defined so as to be associated with combinations of the mobile phones 2 which have been detected. The digital photo frame 1 carries out a slide show display, with respect to pieces of image data, based on an appropriate display rule which is selected from the plurality of display rules in accordance with a combination of the mobile phones 2 which have been detected. Note that, in the following descriptions, the same reference numerals are given to members having functions identical to those of the members described in the drawings which are used for the explanations in Embodiment 1, and the detailed explanations for the members are not repeated.

[Configuration of Digital Photo Frame]

A digital photo frame 1 of the present embodiment (see FIG. 1) is different from that of Embodiment 1 in that (i) the control section 10 includes a display rule selecting section 13 and (ii) the display rule storage section 22 of the storage section 20 stores a plurality of display rules in addition to a default display rule.

The display rule selecting section 13 selects an appropriate display rule to be employed from the plurality of display rules stored in the display rule storage section 22, in accordance with identification information of a mobile communication device identified by the device identifying section 11. The display rule selected by the display rule selecting section 13 is sent to the image display control section 14.

According to the present embodiment, the image display control section 14 extracts pieces of image data from the image data storage section 21, and then changes a way to display the pieces of image data, in accordance with the display rule selected by the display rule selecting section 13.

The display rule storage section 22 stores the plurality of display rules which define how to display plural pieces of image data which can be read by the image display control section 14. Specifically, the plurality of display rules (i) are associated with mobile communication devices (associated with combinations thereof) which have been detected in the device detectable area 3, and (ii) define how to display in accordance with the situation.

[Display Rule]

The following describes details of respective display rules stored in the display rule storage section 22, with reference to the drawings. FIG. 5 is a table illustrating concrete examples of respective display rules stored in the display rule storage section 22.

According to the present embodiment, as shown in FIG. 5, a display rule table stores a plurality of display rules in which (i) mobile communication devices which can be detected in the device detectable area 3 (combinations of the mobile communication devices) and (ii) ways of displaying are associated with one another. According to the examples shown in FIG. 5, it is assumed that the mobile communication devices which can be detected are the mobile phones 2A and 2B shown in FIG. 2, and another mobile phone(s). Note that an alphabet "A" described in a column of mobile communication device(s) (combinations thereof) in FIG. 5 indicates the mobile phone 2A (identification information: 090-1234-5678), and an alphabet "B" indicates the mobile phone 2B (identification information: abc@def.ne.jp). Although these alphabets are used to simplify the descriptions in FIG. 5, it is possible for the control section 10 to identify the mobile phone 2A, the mobile phone 2B, and the other mobile communication devices with the use of their identification information. Therefore, the identification information can be stored in the column, instead of alphabets.

According to the present embodiment, as an example, the ways to display pieces of image data are defined for respective possible combinations of the mobile communication devices. Accordingly, display rules 10 through 17 are defined so as to be associated with the following respective 8 patterns of combinations (see FIG. 5).

(1) The display rule 10 is a display rule for default which rule is selected by the display rule selecting section 13 in a case where no mobile communication device is detected. The display rule 10 is similar to the display rule 00 of Embodiment 1.

(2) The display rule 11 (i) is a rule selected by the display rule selecting section 13 in a case where only the mobile phone 2A is detected and (ii) defines that only pieces of image data (img001 through img003) supplied from the mobile phone 2A are displayed.

(3) The display rule 12 (i) is a rule selected by the display rule selecting section 13 in a case where only the mobile phone 2B is detected and (ii) defines that only pieces of image data (img004 through img006) supplied from the mobile phone 2B are displayed.

(4) The display rule 13 (i) is a rule selected by the display rule selecting section 13 in a case where only another mobile phone(s) (e.g., a mobile phone 2C) is detected and (ii) defines that only pieces of image data (img007 through img009) are displayed which are not supplied from registered devices (the mobile phones 2A and 2B).

(5) The display rule 14 (i) is a rule selected by the display rule selecting section 13 in a case where only the mobile phones 2A and 2B are detected and (ii) defines that the pieces of image data supplied from the registered devices (the mobile phones 2A and 2B) are preferentially displayed. For example, "the pieces of image data supplied from the registered devices are preferentially displayed" may indicate that, in a slide show display in which a predetermined number of pieces of image data are displayed per unit of time, the pieces of image data supplied from the registered devices are displayed, during unit of time, more times than other pieces of image data. Specifically, the image display control section 14 reads out and display the pieces of image data in accordance with the priority defined by the display rule 14 so that a slide show display is carried out per unit of time with respect to (i) four pieces of image data of the mobile phone 2A, (ii) four pieces of image data of the mobile phone 2B, and (iii) two pieces of image data of another mobile communication device.

Alternatively, "the preferential display process" may indicate that, in a slide show display in which a predetermined number of pieces of image data are displayed per unit of time, the pieces of image data supplied from each of the registered devices are displayed at longer intervals. For example, the image display control section 14 controls the slide show display so that pieces of image data supplied from the registered devices are displayed at intervals of 10 seconds, and pieces of image data supplied from another non-registered mobile communication device(s) are displayed at intervals of 5 seconds.

Alternatively, "the preferential display process" may indicate that a ratio of (i) the number of pieces of image data to be used in a slide show display with respect to (ii) the total number of pieces of the image data which are supplied from each of the registered devices and are registered on the image data storage section 21 is larger than that of other image data. Specifically, for example, in a case where 100 pieces of image data supplied from the mobile phone 2A, 50 pieces of image data supplied from the mobile phone 2B, and 300 pieces of image data supplied from another mobile communication device are registered on the image data storage section 21, the image display control section 14 may (i) extract 40 pieces of image data out of the 100 pieces of image data supplied from the mobile phone 2A, 20 pieces of image data out of the 50 pieces of image data supplied from the mobile phone 2B, and 60 pieces of image data out of the 300 pieces of image data supplied from another mobile communication device, and (ii) control the display section 40 to cyclically display extracted pieces of image data in accordance with the priority defined by the display rule 14 shown in FIG. 5.

Alternatively, "the preferential display process" may indicate that the image display control section 14 determines an order, in which a slide show display is carried out with respect to pieces of image data, so that the pieces of image data supplied from the registered devices are displayed earlier.

(6) The display rule 15 (i) is a rule selected by the display rule selecting section 13 in a case where only the mobile phone 2A and another mobile phone are detected and (ii) defines that the pieces of image data supplied from the mobile phone 2A are preferentially displayed whereas the pieces of image data transmitted from the mobile phone 2B are not displayed.

(7) The display rule 16 (i) is a rule selected by the display rule selecting section 13 in a case where only the mobile phone 2B and another mobile phone are detected and (ii) defines that pieces of image data other than the pieces of image data supplied from the registered devices are preferentially displayed whereas the pieces of image data transmitted from the mobile phone 2B are not displayed. The image display control section 14 may thus controls the display section 40 not to display the pieces of image data, which are supplied from the detected registered devices, with the use of the display rule.

(8) The display rule 17 (i) is a rule selected by the display rule selecting section 13 in a case where the mobile phones 2A and 2B and another mobile phone are detected and (ii) defines that the pieces of image data transmitted from the mobile phone 2B are not displayed (the pieces of image data supplied from the mobile phone 2A and the pieces of image data supplied from the another mobile phone are cyclically displayed at even intervals).

Note that the display rules are mere examples for specifically describing the present embodiment, and therefore are not intended to limit the present embodiment. As such, the present embodiment is not limited to the display rules shown in FIG. 5, and it is therefore possible to define display rules in accordance with combinations of the mobile communication devices which combinations vary depending on the number of registered devices. The display rule for default can be also arbitrarily defined.

[Image Display Process of Digital Photo Frame]

Figure 6:
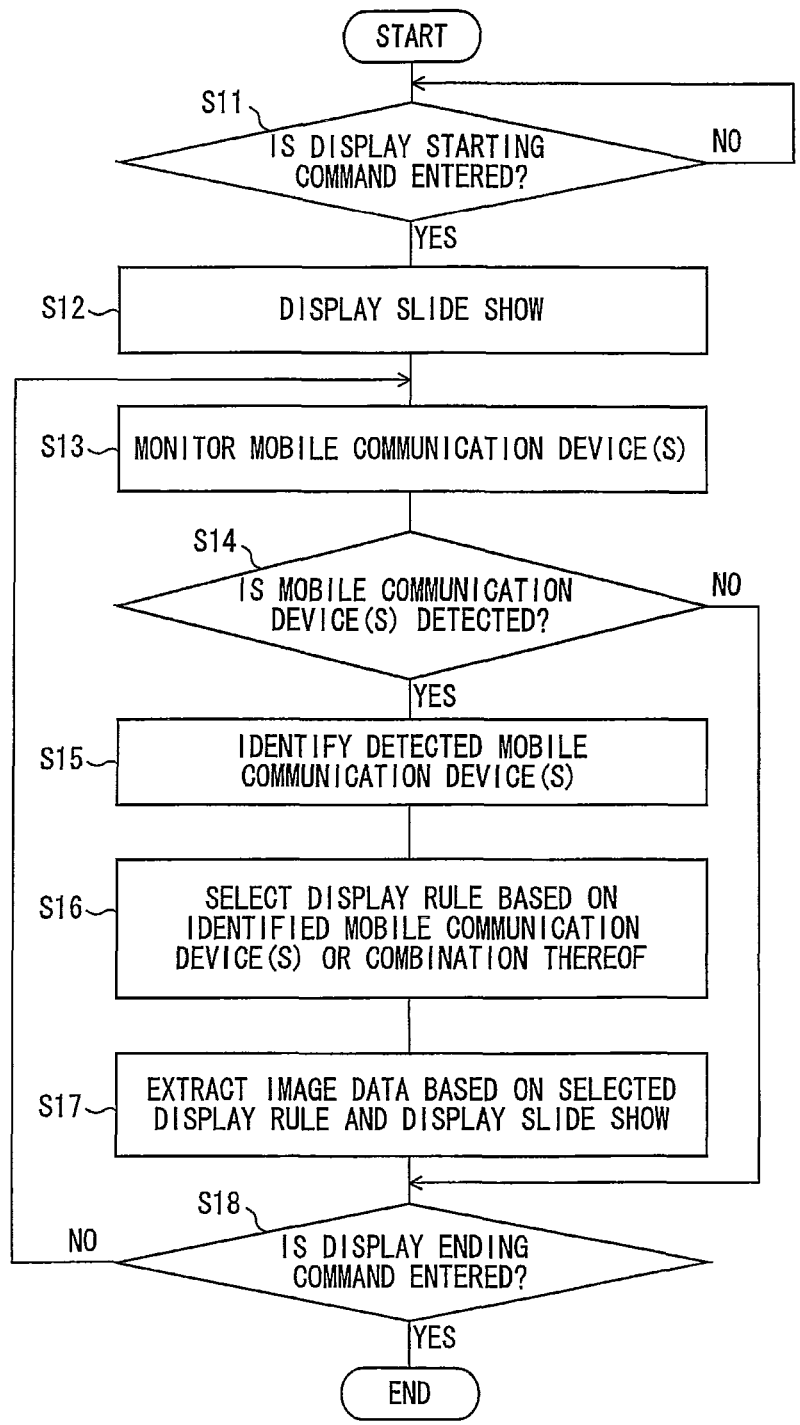
FIG. 6 is a flowchart illustrating a flow of an image data display process performed by a digital photo frame in another embodiment of the present invention.

With reference to FIG. 6, the following description discusses an operation flow of an image data display process in which the digital photo frame 1 of Embodiment 2 displays pieces of image data in accordance with combinations of existing mobile communication devices. FIG. 6 is a flowchart illustrating a flow of an image data display process performed by the digital photo frame 1 in another embodiment of the present invention.

When an input receiving section (not illustrated) of the control section 10 receives a command, which causes a slide show display to start, entered by a user via the operation section 50 (YES in S11), the image display control section 14 starts a slide show display (S12) based on the display rule for default. Concurrently, the device identifying section 11 controls the communication section 30 to start to monitor a mobile communication device(s) in the device detectable area 3(S13).

As long as (i) the communication section 30 does not detect any mobile communication device (NO in S14) and (ii) the user does not enter a command which causes the slide show display to be ended (NO in S18), the image display control section 14 continues the slide show display based on the default display rule, and the communication section 30 continues the monitoring of a mobile communication device.

On the other hand, in a case where the communication section 30 detects a mobile communication device (s) (YES in S14), the device identifying section 11 obtains identification information from the communication section 30 so as to identify the mobile communication device(s) detected by the communication section 30 (S15).

Then, the device identifying section 11 sends, to the display rule selecting section 13, the identification information of the mobile communication device(s) thus identified. The display rule selecting section 13 selects a display rule, from the plurality of display rules shown in FIG. 6, which corresponds to the identification information (or a combination in a case where a plurality of devices are detected) of the mobile communication device(s) which identification information has been sent from the device identifying section 11 (S16).

In accordance with the display rule selected by the display rule selecting section 13, the image display control section 14 reads out pieces of image data from the image data storage section 21 or from other readable external storage medium, and send the pieces of image data thus read out to the display section 40 so as to control the display section 40 to display the pieces of image data in accordance with the display rule (S17).

As long as the user does not enter a command which causes the ending of the slide show display (NO in S18) after the slide show display is started based on the display rule which has been selected in S17, the image display control section 14 continues the slide show display and the communication section 30 continues the monitoring.

When the control section 10 receives from the user, via the operation section 50, the command which causes the slide show display to end (YES in S18), the image display control section 14 stops sending image data to the display section 40 and terminates the process.

The following describes how the digital photo frame 1 is operated by the above described method, with the use of a concrete example. As shown in FIG. 2, in a case where only the mobile phone 2A and the mobile phone 2B are detected in the device detectable area 3, the device identifying section 11 determines, based on identification information which the communication section 30 has obtained, that a combination of the mobile phone 2A and the mobile phone 2B is in the device detectable area 3 (S15).

Then, in S16, the display rule selecting section 13 selects the display rule 14 which corresponds to the combination of the mobile phones 2A and 2B (a combination of the pieces of identification information: "090-1234-5678" and "abc@def.ne.jp").

In S17, based on the display rule 14 (shown in FIG. 6), the image display control section 14 reads out, from the image data storage section 21, pieces of image data img001 through img006 which are associated with identification information "090-1234-5678" or "abc@def.ne.jp", and then carries out a slide show display. During the slide show display, the image display control section 14 cyclically displays the pieces of image data supplied from the mobile phone 2A, the pieces of image data supplied from the mobile phone 2B, and other pieces of image data to be displayed at respective rates of 40%, 40%, and 20%.

Subsequently, in a case where the mobile phone 2A is moved outside the device detectable area 3 before the user enters a command which causes the slide show display to be ended, the device identifying section 11 determines, based on the identification information obtained from the communication section 30, that only the mobile phone 2B is in the device detectable area 3. The display rule selecting section 13 selects the display rule 12 based on the identification information "abc@def.ne.jp". The image display control section 14 changes a way to display so as to carry out the slide show display, based on the display rule 12, with respect only to the pieces of image data img004 through img006 which are associated with the identification information "abc@def.ne.jp" shown in FIG. 3.

Then, in a case where the mobile phone 2C, which is a non-registered device, is further moved in the device detectable area 3, the image display control section 14 changes pieces of image data to be displayed or changes rates or intervals at which the pieces of image data are displayed, in accordance with the display rule 16 selected by the display rule selecting section 13.

According to the digital photo frame 1 of the present embodiment, it is thus possible to detect mobile communication devices in the device detectable area 3, and then to select an appropriate display rule based on (i) whether or not the mobile communication devices thus detected are in the device detectable area 3 and (ii) a combination of the mobile communication devices which are in the device detectable area 3. This allows the digital photo frame 1 to read out and display, based on a selected appropriate display rule, appropriate pieces of image data in a manner appropriate for the situation. As a result, the digital photo frame 1 can change how to display in accordance with a change in situation (whether or not the mobile communication devices is in the device detectable area 3), even though users of the mobile communication devices do not carry out respective additional operations on the digital photo frame 1.

[Another Example of Display Rule]

The digital photo frame 1 of the present embodiment is not limited to the display rule table shown in FIG. 5, but may have a display rule table from which a display rule is selected in accordance with the number of registered devices and the number of non-registered devices, which are in the device detectable area 3.

FIG. 7 is a table illustrating another concrete example of display rules stored in the display rule storage section of the digital photo frame.

In the display rule table shown in FIG. 7, display rules are associated with situations of (i) whether or not a non-registered device and a registered device are in the device detectable area 3 and (ii) whether the number of the registered device(s) is singular or plural (in a case where a registered device(s) is(are) in the device detectable area 3). According to the example shown in FIG. 7, six types of display rules (display rules 20 through 25) are defined so as to correspond to six situations. According to the example shown in FIG. 7, several patterns of displaying ways are prepared in advance for each of the display rules. These patterns of displaying ways are referred to as display patterns.

According to the display rule table shown in FIG. 7, one of the plurality of display patterns is set in advance for each of the display rules 20 and 23 which correspond to a situation where none of registered device is registered in the device detectable area 3, and each situation is associated one-to-one with a corresponding display pattern. A user can select and set a desired display pattern. With regard to the display rules 21, 22, 24, and 25 each of which corresponds to a situation where at least one registered device is in the device detectable area 3, any one of display patterns is associated with a corresponding registered device.

This allows the display rule selecting section 13 to (i) select an appropriate display pattern in accordance with a situation in the device detectable area 3 (i.e. how many registered device and non-registered device are in the device detectable area 3) which situations are determined by the device identifying section 11 and (ii) send the appropriate display pattern to the image display control section 14.

Alternatively, the digital photo frame 1 may associate pieces of image data with a display rule so as to change a displaying way in accordance with whether or not a mobile communication device is in the device detectable area 3.

In this case, the display rule storage section 22 stores a display rule list on which displaying ways are listed in association with the respective display rule numbers. For example, it is assumed that three display rules are defined: display rule 30 for displaying in a case where the mobile phone 2A is in the device detectable area 3, display rule 31 for displaying in a case where the mobile phone 2B is in the device detectable area 3, and display rule 32 for displaying in a case where another non-registered device is not in the device detectable area 3.

It is further assumed that (i) pieces of image data which can be read out by the digital photo frame 1 and (ii) information indicating which one of the pieces of image data is associated with which one of the display rules, are stored in the image data table (image data storage section 21) shown in FIG. 3.

According to the above configuration, the image display control section 14 can extract pieces of image data associated with a selected display rule. The display rule has been selected based on the mobile phones 2A and 2B which have been detected and based on whether or not another non-registered device has been in the device detectable area 3. The image display control section 14 controls the display section 40 to display the pieces of image data thus extracted. For example, in a case where only the mobile phone 2A is detected, the image display control section 14 (i) extracts pieces of image data which are stored in the image data storage section 21 so as to be associated with the display rule 30 or the display rule 32 and (ii) controls the display section 40 to display the pieces of image data thus extracted.

[Remarks]

Note that the digital photo frame is discussed in each of the embodiments as a concrete example of the information display device of the present invention. However, the embodiments are not limited to this, provided that the device has a function to display various kinds of data such as image data obtained via communication with a mobile communication device. Instead of the digital photo frame, a personal computer (PC), a digital television, or a mobile phone, etc. can be used as the information display device, for example.

Moreover, the mobile phone is discussed as a concrete example of the mobile communication device which supplies images to the information display device of the present invention. However, the present invention is not limited to this, provided that the device transmits image data to the information display device via communication with that information display device. Instead of the mobile phone, a digital (video) camera, a PDA (Personal Digital Assistant), a laptop computer, or a portable game device, etc. can be used as the mobile communication device, for example. Alternatively, in a case where the information display device has a function to read out an IC chip, an IC tag containing image data, a portable product in which the IC tag is embedded, or IC card, etc. can be used as the mobile communication device.

Note that the embodiments discuss the case where the digital photo frame displays pieces of image data such as static images and/or moving images. However, an object to be displayed is not limited to the image data. The present invention encompasses an embodiment in which various kinds of object data (HTML data, XML data, text data, document data, etc.) which can be displayed by the information display device is received from the mobile communication device and displayed in accordance with whether or not the mobile communication device which is a supply source is in the device detectable area 3.

Note that, in a case where the image display control section 14 displays pieces of image data based on the priorities of respective image data supply sources, the image display control section 14 may refer to not only identification information associated with the pieces of image data, but also other information associated with the pieces of image data. With reference to the other information, the image display control section 14 can change a way to display the pieces of image data by controlling (i) the number of pieces of image data to be displayed, (ii) intervals at which the pieces of image data are displayed, and/or (iii) an order in which the pieces of image data are displayed. For example, the image display control section 14 changes a way to display pieces of image data by taking into consideration other information such as image data ID, registration date and time, date and time of image capture, location of image capture, the number of pieces of registered image data for each mobile communication device (see FIG. 3).

More specifically, in a case where a slide show display is carried out with respect to the restricted number of pieces of image data based on the priorities set for respective mobile communication devices which are image data supply sources, the pieces of image data to be displayed may be selected in an ascending or descending order of the image data IDs or in the order registered or captured. Alternatively, the image display control section 14 may change, based on a display rule, a way to display the pieces of image data supplied from a mobile communication device which has a large total number of pieces of registered image data, by shortening or lengthening intervals at which the pieces of image data are displayed in accordance with whether or not the mobile communication device is in the device detectable area 3. Alternatively, the image display control section 14 may change, based on a display rule, a way to display pieces of image data so as to display (or not to display), in accordance with whether or not a mobile communication device is in the device detectable area 3, pieces of image data which have been captured in a particular capture location.

According to the example shown in FIG. 3, the pieces of image data are associated one-to-one with identification information of a corresponding mobile communication device. However, the data structure of the image data storage section 21 is not limited to this. It is possible to set a display rule so that a piece of image data, which is stored to be associated with pieces of identification information of a plurality of mobile communication devices, is displayed when any one of or all of the plurality of mobile communication devices are detected.

The present invention is not limited to the embodiments, but can be altered by a skilled person in the art within the scope of the claims. An embodiment derived from a proper combination of technical means disclosed in respective different embodiments is also encompassed in the technical scope of the present invention.

Lastly, each block of the digital photo frame 1 which serves as the information display device of the present invention, in particular, the device identifying section 11, the image managing section 12, the display rule selecting section 13, and the image display control section 14 can be configured by hardware logic, or realized by software with the use of a CPU as follows.

That is, the information display device includes a CPU (central processing unit), a ROM (read only memory), a RAM (random access memory), and a memory device (memory medium) such as a memory. The CPU executes instructions in control programs for realizing each function. The ROM contains the program which is loaded on the RAM, and the memory device stores the program and various data. The objective of the present invention can also be achieved, by providing the information display device with a computer-readable storage medium storing control program codes (executable program, intermediate code program, or source program) for the information display device, serving as software for realizing the foregoing respective functions, so that the computer (or CPU or MPU) retrieves and executes the program code stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the information display device can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

Means for Solving Problem

In order to attain the object, in the information display device of the present invention, a display section displays plural pieces of data stored in a data storage section, the information display device, further including: a device detector configured to detect a mobile communication device and identifying identification information of the mobile communication device, the identification information of the mobile communication device being associated with part of the plural pieces of data stored in the data storage section; and a data display controller configured to carry out a first display control in which the display section displays one or more first pieces of data, when the device detector detects the mobile communication device, the one or more first pieces of data being associated with the identification information identified by the device detector, out of the plural pieces of data stored in the data storage section, the first display control being different from a second display control which is carried out with respect to one or more second pieces of data other than the one or more first pieces of data.

According to the configuration, first, the device detector detects a mobile communication device and identifies identification information of the mobile communication device thus detected.

Then, the data display controller identifies, based on the identification information which has been identified by the device detector, data which is associated with the identification information among the plural pieces of data stored in the data storage section. That is, the data display controller distinguishes (i) the first piece of data which is associated with a mobile communication device detected by the device detector from (ii) other than the first piece of data.

Lastly, the data display controller carries out a display control, which is different from a display control to the other data, to the data which is associated with the mobile communication device detected by the device detector so that the display section displays the data associated with the mobile communication device, in a manner different from that for the other data.

As such, the data which is associated with the mobile communication device detected by the device detector is displayed on the display section based on the display control which is different from a display control with respect to the other data.

As a result, the information display device is capable of changing a way (display controlling method) to display plural pieces of data in accordance with existence or nonexistence of a detectable mobile communication device.

More specifically, the data display controller is capable of controlling the display section to display only data which is associated with the identification information identified by the device detector.

According to the configuration, the data display controller controls the display section to display only data which is associated with the mobile communication device detected by the device detector whereas not to display the other data.

As a result, the information display device is capable of switching between display and non-display of plural pieces of data in accordance with existence or nonexistence of a mobile communication device.

That is, in a case where a mobile communication device is in a range in which the device detector can detect, it is possible to control the display section to display only data which is associated with the mobile communication device. The data display controller switches between display and non-display of data in accordance with whether or not the mobile communication device is in the range. Accordingly, the user who has the mobile communication device does not need to further operate the information display device for changing data to be displayed. This makes it possible to enhance conveniences for users.

Moreover, in a case where the identification information identified by the device detector is only identification information which is stored so as to be associated with data in the data storage section, the data display controller controls the display section to display the one or more first pieces of data; whereas in a case where the identification information identified by the device detector further contains another identification information different from the identification information which is stored so as to be associated with the data in the data storage section, the data display controller controls the display section not to display the one or more first pieces of data.

According to the configuration, in a case where only a registered mobile communication device (registered device), that is, a mobile communication device having identification information which is stored in the data storage section so as to be associated with data is detected by the device detector, the data display controller reads out, from the data storage section, the data which is associated with the detected mobile communication device so that the data is displayed.

On the other hand, in a case where a mobile communication device (non-registered device) which does not have identification information which is associated with data stored in the data storage section is detected by the device detector along with a registered device, the data display controller controls the display section not to display data which is associated with the detected registered device.

In a state where a mobile communication device (registered device) associated with data which is registered on the information display device is detected, it is likely that a user of the registered device desires to view registered data with the use of the information display device. In a case where only the registered device is detected, it is also likely that only the user registered the data can view the information display device. Therefore, the display section can be controlled so as to display only data desired by the user, without being viewed by others.

On the other hand, in a case where a mobile communication device (non-registered device) whose data is not registered is also detected, it is likely that the information display device can be viewed by somebody else as well as the user who has registered data. In such a case where somebody else can view the information display device, the user does not necessarily desire to view the registered data with the use of the information display device.

In view of this, in a case where a non-registered device is detected, it is possible to control the display section not to display the data registered by the user so that the data cannot be viewed by somebody else, even though the registered device of the user is detected.

As a result, even though the user does not carry out an additional operation, it is possible to switch between display and non-display of plural pieces of data in accordance with whether or not the mobile communication device is in the detectable area. This leads to enhancement of conveniences for the users.

It is preferable that the information display device further includes data managing means for causing the data storage section to store one or more pieces of data which is received from the mobile communication device so that each of the one or more pieces of data is associated with the identification information of the mobile communication device which is a supply source of the one or more pieces of data.

According to the configuration, when a mobile communication device transmits data to the information display device of the present invention, the data managing means associates the data thus received with identification information of the mobile communication device which has transmitted the data, and causes the data storage section to store the data.

When the device detector detects the mobile communication device which has transmitted the data, the data display controller distinguishes, from the other data, the data which is associated with the identification information of the mobile communication device which is a supply source of the data, and controls the display section to display the data in a display manner different from that for the other data.

Specifically, the user transmits in advance desired data from the mobile communication device to the information display device so as to register the desired data on the information display device. Then, in a case where the user holding the mobile communication device is in a position where the device detector can detect the mobile communication device, the data display controller controls the display section to display, with a display method which is different from that for the other data, only data received from the detected mobile communication device. For example, only data transmitted from the mobile communication device held by the user can be displayed on the display section.

As described above, after the user transmits data from his/her own mobile communication device to the information display device, data to be displayed on the display section is switched or a way to display the data is changed based only on whether or not his/her own mobile communication device is in a detectable area of the information display device. Therefore, the user does not need to additionally operate the information display device.

As a result, the user, who has only transmitted data to the information display device with the use of a mobile communication device, can change a way to display plural pieces of data in accordance with existence or nonexistence of the mobile communication device, without additional operation.

It is preferable that the device detector detects a mobile communication device which is in a device detectable area of the information display device with use of a short-range wireless communication device.

According to the configuration, the device detector detects a mobile communication device which is near the information display device. That is, the data display controller can control the display section to display data which is associated with the mobile communication device being near the information display device in a way different from that for other data.

In a situation where a mobile communication device is detected by the short-range wireless communication device, the information display device can be viewed by the user of the mobile communication device. In such a case, for example, it is possible to display only data which is associated with the mobile communication device. When the user comes near the information display device, the user can efficiently view only data which is associated with his/her own mobile communication device with the use of the information display device.

It is possible that the plural pieces of data stored in the data storage section are plural pieces of image data; and the data display controller carries out a slide show display by controlling the display section to display pieces of image data which are selectively retrieved from the data storage section, in a predetermined display order and at a predetermined display intervals.

According to the configuration, the data display controller distinguishes image data which is associated with a detected mobile communication device from other image data, and thereby changes, for each of plural pieces of image data, a way to display each of the plural pieces of image data in a slide show. For example, the data display controller can (i) selectively output pieces of image data to be displayed in a slide show, (ii) change a display order of the pieces of image data, and (iii) change display intervals (seconds) of the pieces of image data.

Moreover, it is possible that the data display controller carries out a preferential display control in which one or more pieces of image data each of which is associated with identification information identified by the device detector are displayed in preference to other image data, and the preferential display control including at least one of following controls with respect to the one or more pieces of image data to be displayed preferentially: (a) increasing a ratio of the number of the one or more pieces of image data out of the total number of pieces of image data which are to be displayed per unit time in the slide show display, (b) increasing a ratio of the number of pieces of image data, which are used in the slide show display, out of the total number of pieces of the image data for each identification information stored in the data storage section, (c) increasing intervals at which the one or more pieces of image data are displayed, and (d) putting forward the display order.

According to the configuration, the data display controller distinguishes, from the other image data, image data which is associated with the detected mobile communication device, and causes the display section to preferentially display the image data. For example: more pieces of the image data which are associated with the detected mobile communication device than the other image data can be displayed; registered image data can be used as much as possible in a slide show; a display interval of a single piece of the registered image data can be increased; and/or the display order of the registered image data can be put forward.

The information display device can further includes: a display rule storage section which stores display rules, which define respective display control methods carried out by the data display controller, so that the display rules are associated with respective combinations of mobile communication devices which can be detected by the device detector; and a display rule selector configured to select, from the display rule storage section, a display rule which is associated with a corresponding one of the combinations of the mobile communication devices detected by the device detector, the data display controller carrying out the first display control, in accordance with the display rule selected by the display rule selector, with respect to the one or more first pieces of data associated with the identification information identified by the device detector.

According to the configuration, a display rule is selected which is appropriate for a combination of mobile communication devices detected by the device detector, and accordingly data can be displayed in a way appropriate for the situation.

The configuration makes it possible to carryout various detailed display controls in accordance with existence or nonexistence of a plurality of mobile communication devices, and accordingly a way to display data can be changed more appropriately depending on situations.

It is possible that each of the plural pieces of data stored in the data storage section is associated with a corresponding one of display rules which controls a corresponding one of the plural pieces of data to be displayed or not to be displayed in accordance with existence or nonexistence of a corresponding mobile communication device; and when the device detector detects the corresponding mobile communication device, the data display controller controls, in accordance with the corresponding mobile communication device thus detected, whether or not to display the corresponding one of the plural pieces of data based on the corresponding one of the display rules associated with the corresponding one of the plural pieces of data.

According to the configuration, the data display controller controls whether or not to display each piece of data in accordance with existence or nonexistence of the mobile communication device.

Note that the information display device can be realized by a computer. In such a case, the present invention encompasses (i) a control program of the information display device which control program causes the computer to serve as the above described means for realizing the information display device and (ii) a computer-readable storage medium storing the control program.

INDUSTRIAL APPLICABILITY

The present invention is applicable to a digital photo frame, etc. which stores pieces of image data, etc. and displays the stored pieces of image data.

REFERENCE SIGNS LIST

1: Digital photo frame (Information display device/Image display device)
2: Mobile phone (Mobile communication device)
2A: Mobile phone (Mobile communication device)
2B: Mobile phone (Mobile communication device)
2C: Mobile phone (Mobile communication device)
3: Device detectable area
4: Image data (Data)
10: Control Section
11: Device identifying section (Device detector)
12: Image managing section (Data managing means)
13: Display rule selecting section (Display rule selector)
14: Image display control section (Data display controller)
20: Storage section
21: Image data storage section (Data storage section)
22: Display rule storage section
30: Communication section (Device detector/Short-range wireless communication device)
40: Display section
50: Operation section
100: Image display system

The invention claimed is:

1. An information display device in which a display section displays plural pieces of data stored in a data storage section, said information display device further comprising:
   a communication section configured to receive pieces of data from a mobile communication device and to monitor for a registered mobile communication device or a non-registered mobile communication device in a device detectable area in which presence of the mobile communication device is detected, wherein the non-registered mobile communication device is a mobile communication device for which no identification information and pieces of data have been received and stored in the data storage section;
   a device detector configured to, upon detecting the mobile communication device in the device detectable area, obtaining identification information of the mobile communication device, and identifying the mobile communication device based on identification information of the detected mobile communication device stored in association with part of the plural pieces of data stored in the data storage section; and
   a data display controller configured to change, responsive to the device detector detecting the mobile communication device, depending on a first display control in which the display section displays one or more first pieces of data, the way to display the one or more first pieces of data of the part of the plural pieces of data stored in association with the identification information identified by the device detector, out of the plural pieces of data stored in the data storage section, wherein the way to display the one or more first pieces of data is different depending on whether or not a mobile communication device is detected or not, and whether the detected mobile communication device is a registered mobile communication device or is a non-registered mobile communication device, wherein the way to display includes a default way to display for a case that a mobile communication device is not detected in the device detectable area;
   the device detector configured to detect that the mobile communication device is moved out of the device detectable area,
   the data display controller configured to change, responsive to the device detector detecting that the mobile communication device is moved out of the device detectable area, the way to display the one or more first pieces of data back to the way to display before the device detector had detected the mobile communication device in the device detectable area,
   the first display control being different from a second display control which is carried out with respect to one or more second pieces of data other than the one or more first pieces of data, and
   the first display control changing the way to display the one or more first pieces of data by changing at least one of (i) the number of first pieces of data to be displayed, (ii) an order in which the first pieces of data are displayed, and (iii) intervals at which the first pieces of data are displayed.

2. The information display device as set forth in claim 1, wherein:
   the data display controller controls the display section to display only the first piece of data which is associated with the identification information identified by the device detector.

3. The information display device as set forth in claim 1, wherein:
   in a case where the identification information identified by the device detector is only identification information which is stored so as to be associated with data in the data storage section, the data display controller controls the display section to display the one or more first pieces of data; whereas
   in a case where the identification information identified by the device detector further contains another identification information different from the identification information which is stored so as to be associated with the data in the data storage section, the data display controller controls the display section not to display the one or more first pieces of data.

4. The information display device as set forth in claim 1, further comprising:
   a data manager configured to cause the data storage section to store one or more pieces of data which is received from the mobile communication device so that each of the one or more pieces of data is associated with the identification information of the mobile communication device which is a supply source of the one or more pieces of data.

5. The information display device as set forth in claim 1, wherein:
   the device detector detects a mobile communication device which is in a device detectable area of the information display device with use of a short-range wireless communication device, such that the data display controller changes the way to display the one or more first pieces of data responsive to the device detector detecting the mobile communication device in the device detectable area of the information display device.

6. The information display device as set forth in claim 1, wherein:
   the plural pieces of data stored in the data storage section are plural pieces of image data; and the data display controller carries out a slide show display by controlling the display section to display pieces of image data which are selectively retrieved from the data storage section, in a predetermined display order and at a predetermined display intervals.

7. The information display device as set forth in claim 6, wherein:
the data display controller carries out a preferential display control in which one or more pieces of image data each of which is associated with identification information identified by the device detector are displayed in preference to other image data, and
the preferential display control including at least one of following controls with respect to the one or more pieces of image data to be displayed preferentially:
(a) increasing a ratio of the number of the one or more pieces of image data out of the total number of pieces of image data which are to be displayed per unit time in the slide show display,
(b) increasing a ratio of the number of pieces of image data, which are used in the slide show display, out of the total number of pieces of the image data for each identification information stored in the data storage section,
(c) increasing intervals at which the one or more pieces of image data are displayed, and
(d) putting forward the display order.

8. The information display device as set forth in claim 1, further comprising:
a display rule storage section which stores display rules, which define respective display control methods carried out by the data display controller, so that the display rules are associated with respective combinations of mobile communication devices which can be detected by the device detector; and
a display rule selector configured to select, from the display rule storage section, a display rule which is associated with a corresponding one of the combinations of the mobile communication devices detected by the device detector,
the data display controller carrying out the first display control, in accordance with the display rule selected by the display rule selector, with respect to the one or more first pieces of data associated with the identification information identified by the device detector.

9. The information display device as set forth in claim 1, wherein:
each of the plural pieces of data stored in the data storage section is associated with a corresponding one of display rules which controls a corresponding one of the plural pieces of data to be displayed or not to be displayed in accordance with existence or nonexistence of a corresponding mobile communication device as detected by the device detector; and
when the device detector detects the corresponding mobile communication device, the data display controller controls, in accordance with the corresponding mobile communication device thus detected, whether or not to display the corresponding one of the plural pieces of data based on the corresponding one of the display rules associated with the corresponding one of the plural pieces of data.

10. A method for displaying information for an information display device in which a display section displays plural pieces of data stored in a data storage section,
said method comprising the steps of:
receiving pieces of data from a mobile communication device;
storing in the data storage section the plural pieces of data;

(a) monitoring for a registered mobile communication device or a non-registered mobile communication device in a device detectable area in which the mobile communication device can communicate with the information display device by wireless, wherein the non-registered mobile communication device is a mobile communication device for which no identification information and pieces of data have been received and stored in the data storage section;
(b) upon detecting the mobile communication device in the device detectable area, obtaining identification information of the mobile communication device, and identifying the mobile communication device based on identification information of the detected mobile communication device being stored in association with part of the plural pieces of data stored in the data storage section;
(c) responsive to detecting the mobile communication device in step (b), changing, depending on a first display control in which the display section displays one or more first pieces of data, the way to display the one or more first pieces of data of the part of the plural pieces of data stored in association with the identification information identified in the step (b), out of the plural pieces of data stored in the data storage section, wherein the way to display the one or more first pieces of data is different depending on whether or not a mobile communication device is detected, and whether the detected mobile communication device is a registered mobile communication device or is a non-registered mobile communication device, wherein the way to display includes a default way to display for a case that a mobile communication device is not detected in the device detectable area;
(d) detecting that the mobile communication device is moved out of the device detectable area; and
(e) changing, responsive to detecting that the mobile communication device is moved out, the way to display the one or more first pieces of data back to the way to display before detecting the mobile communication device in the device detectable area;
the first display control being different from a second display control which is carried out with respect to one or more second pieces of data other than the one or more first pieces of data, and
the first display control changing the way to display the one or more first pieces of data by changing at least one of (i) the number of first pieces of data to be displayed, (ii) an order in which the first pieces of data are displayed, and (iii) intervals at which the first pieces of data are displayed.

11. The information display device as set forth in claim 1, wherein the device detector is configured to detect a plurality of mobile communication devices in the device detectable area, obtain identification information for the plurality of mobile communication devices, and identify each of the plurality of mobile communication devices, the data display controller configured to change, responsive to the device detector detecting the plurality of mobile communication devices, depending on a first display control in which the display section displays one or more first pieces of data, the way to display the one or more first pieces of data of the part of the plural pieces of data stored in association with each identification information identified by the device detector, out of the plural pieces of data stored in the data storage section.

* * * * *